Patented Nov. 17, 1942

2,301,966

UNITED STATES PATENT OFFICE 2,301,966

PROCESS FOR THE MANUFACTURE OF VALUABLE PRODUCTS FROM OLEFINS

Richard Michel and Ludwig Müller, Krefeld-Uerdingen, Germany; vested in the Alien Property Custodian No Drawing. Application March 20, 1937, Serial No. 132,180. In Germany April 2, 1936

5 Claims. (Cl. 260—683)

This invention relates to a process for the manufacture of valuable products from olefins.

In accordance with the invention an olefin is reacted with an unsaturated compound selected from the group consisting of an olefin, an aromatic compound and a partially hydrogenated aromatic compound in the presence of a compound selected from the group consisting of a hetero-polyacid and an acid salt of a hetero-polyacid, i. e., an acid of this type, part of the acid hydrogen atoms of which are substituted by a metal.

Among the hetero-polyacids found appropriate for the process of the present invention may be mentioned phosphotungstic acid, phospho-molybdic acid, phospho-molybdic-tungstic acid, phospho-vanadic acid, silico-molybdic acid, silico-tungstic acid, arsenious molybdic acid and boron-tungstic acid. As already mentioned before instead of these hetero-polyacids acid salts thereof may be employed, for example the acid salts of the hetero-polyacids mentioned before with sodium, potassium, barium, copper, mercury, arsenic and lead.

Among the olefins suitable for the purpose of this invention may be mentioned, for example, ethylene, propylene, α-butyl, β-butylene, isobutylene, amylene, hexylene, nonylene, dodecylene, pentadecylene, butadiene, isoprene and cyclic olefins, such as cyclohexene, methyl and dimethyl cyclohexenes and cyclohexadiene.

It is by no means necessary for the process of the invention to employ these olefins in a pure state. They may indeed be used in admixture with one another or with other gases, such as for example, in the form of waste gases derived from cracking processes.

Impurities of the gas mixture, such as for example, hydrogen sulfide may be removed in any known manner before subjecting the gas to the process of this invention.

When an olefin as such or in admixture with other olefins is subjected to the action of the catalysts referred to, polymerisation products or mixed polymerisation products are obtained.

Furthermore when an olefin as such or in admixture with other olefins is subjected to the action of the catalysts referred to in the presence of an aromatic compound or partially saturated aromatic compound, condensation products are obtained. The condensation of the olefin with the aromatic or partially saturated aromatic compound probably proceeds in such a manner that at least one alkyl side chain is attached to the nucleus, the number of the carbon atoms of the side chain corresponding to the number of the carbon atoms of the olefin employed. In this manner from benzene, naphthalene, anthracene, phenanthrene, pyrene, carbazole, substitution products of these hydrocarbons, such as toluene, xylene, ethyl benzene, halogenated benzenes, for example chlorobenzene, furthermore methyl naphthalene, isopropyl naphthalene, partially hydrogenated aromatic hydrocarbons, such as tetrahydronaphthalene or substitution products thereof, aromatic hydroxy compounds, such as phenol, cresol, naphthol, phenol ethers, such as anisole, phenetole, finally aromatic acids, such as salicylic acid and the like, the corresponding alkylation products are obtained.

In general the reaction may be accelerated by the addition of a catalyst, especially a heavy metal salt, such as a copper, silver or nickel salt.

If desired or required the reaction may be performed in the presence of a solvent, which does not react under the reaction conditions, such as for example, in the presence of ligroine, decahydronaphthalene, carbon tetrachloride, chloroform, etc., this method of working being of particular advantage if one of the reaction components is solid under the temperature conditions employed.

The temperature and pressure at which the condensation is carried out may vary within wide limits. We have obtained good results with temperatures and pressures ranging from above about 100° C. and atmospheric pressure to about 200° C. and the corresponding elevated pressure given by the nature of the reaction material and especially from about 130 to about 200° C., the upper limit for the temperature and the corresponding pressure being only given by the decomposition point of the components of the reaction mixture and by the resistivity of the construction material.

In contradistinction to the known process for the polymerisation of olefins in the presence of catalysts of the Friedel-Crafts type whereby mainly oils of higher boiling range are obtained, the process of the present invention enables the production of polymerisaiton products of essentially lower boiling range.

The invention is illustrated but not restricted by the following examples; the parts are by weight:

Example 1

1000 parts by weight of isobutylene added with 100 parts by weight of an acid sodium salt of phospho-tungstic acid in which 3 of the 7 acid hydrogen atoms of the phospho-tungstic acid are substituted by sodium, are stirred at 175° C. for 1½ hours in a copper autoclave at a pressure of about 15 atmospheres. The reaction product is then separated from the acid phospho-tungstic acid salt and fractionally distilled. 500 parts by weight of diisobutylene with a boiling range of 100–110° C. and 300 parts by weight of triisobutylene with a boiling range of 175–190° C. are thus obtained.

Example 2

470 parts by weight of phenol are subjected for 2 hours in a copper autoclave at a temperature of 175° C. to condensation with isobutylene gas in the presence of 50 parts by weight of phospho-tungstic acid. After separating the reaction product from the phospho-tungstic acid and fractionally distilling there is obtained as principal product p-isobutylphenol melting at 99° C. with recovery of unchanged phenol.

Example 3

672 parts by weight of isododecylene boiling at 175–200° C. are heated with stirring for 7 hours at 160–170° C. with 380 parts by weight of phenol and 70 parts by weight of an acid sodium salt of phospho-molybdic-tungstic acid in which 3 of the 7 acid hydrogen atoms of the phospho-molybdic-tungstic acid are substituted by sodium. After filtration from the acid salt the reaction product is distilled under reduced pressure. As the main fraction there are obtained 740 parts by weight of a completely colorless isododecyl-phenol, which distills at 195–200° C. under a pressure of 15 mms. mercury gauge.

Example 4

504 parts by weight of isononylene of the boiling range 130–150° C. are condensed by using again the acid sodium salt of phospho-molybdic-tungstic acid employed in Example 3 with 416 parts by weight of crude cresol (40% phenol, 50% cresols, 10% xylenols) in a copper autoclave at 160–170° C. 620 parts by weight of a colorless isononyl- (crude)-cresol product are obtained boiling at 165–195° C. under a pressure of 15 mms. mercury gauge.

We claim:

1. Process which comprises reacting at a temperature above about 100° C. upon an olefin with an acid salt of a hetero-polyacid.

2. Process which comprises reacting at a temperature above about 100° C. upon an olefin with an acid alkali salt of a hetero-polyacid.

3. Process which comprises reacting at a temperature of about 130° C. to about 200° C. upon an olefin with an acid alkali salt of a hetero-polyacid.

4. Process which comprises reacting at a temperature of about 130° C. to about 200° C. at elevated pressure upon an olefin with an acid alkali salt of a hetero-polyacid.

5. Process which comprises reacting at a temperature of about 175° C. and a pressure of about 15 atmospheres upon isobutylene with an acid sodium salt of phospho-tungstic acid in which 3 of the 7 acid hydrogen atoms of the phospho-tungstic acid are substituted by sodium.

RICHARD MICHEL.
LUDWIG MÜLLER.